March 24, 1925.
J. W. VANDERVEER
HOLLOW CAST WHEEL
Filed Oct. 10, 1923
1,530,863
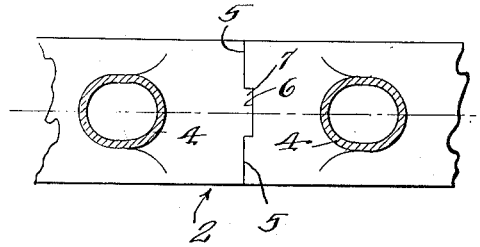
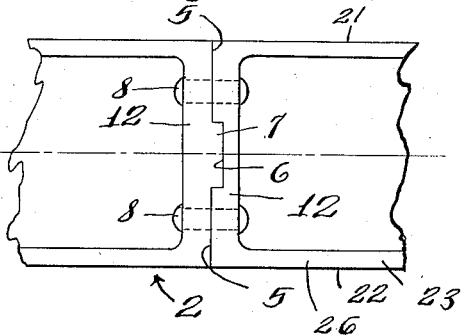
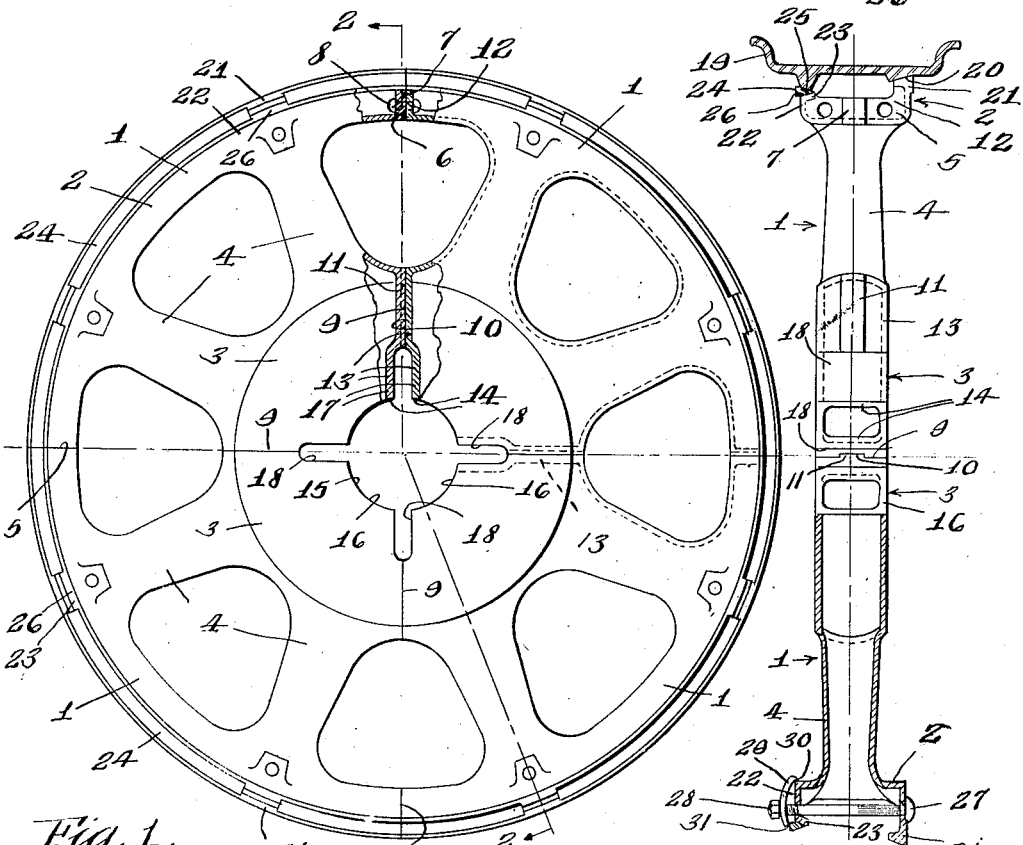
INVENTOR.
BY
ATTORNEYS.

Patented Mar. 24, 1925.

1,530,863

UNITED STATES PATENT OFFICE.

JEWELL W. VANDERVEER, OF ONEIDA, NEW YORK.

HOLLOW CAST WHEEL.

Application filed October 10, 1923. Serial No. 667,740.

*To all whom it may concern:*

Be it known that I, JEWELL W. VANDER-VEER, a citizen of the United States, and a resident of Oneida, in the county of Oneida and State of New York, have invented a certain new and useful Hollow Cast Wheel, of which the following is a specification.

This invention relates to hollow cast metal vehicle wheels, and has for its object such a wheel which is particularly light and strong and economical of manufacture. It further has for its object a hollow sectional wheel, and a particularly simple, efficient and rigid interfitting construction by which the sections are united together.

Other objects will appear throughout the specification.

This invention consists in the novel features and in the combinations and constructions hereinafter set forth and claimed.

In describing this invention, reference is had to the accompanying drawings in which like characters designate corresponding parts in all the views.

Figure 1 is an elevation, partly broken away of a wheel embodying my invention.

Figure 2 is a sectional view on line 2—2, Fig. 1.

Figure 3 is a fragmentary inner face view of the abutting ends of adjacent felloe sections.

Figure 4 is an enlarged outer face view of the peripheral face of the abutting ends of adjacent felloe sections.

This wheel comprises generally, a hollow felloe, a hollow hub, and hollow spokes.

The wheel is preferably formed or cast in sections 1, each section including a felloe segment 2, a hug segment 3, and spokes 4, the felloe segments being in the form of a channel open at its periphery. Some of such segments 2 and 3 and preferably all of them are formed with faces at their ends which abut against the faces of the adjacent sections.

As here shown, the felloe segments 2 are formed with faces 5 at their abutting ends, these faces extending in a general radial direction, and being here shown as extending in an exact radial direction.

Each pair of abutting faces is formed with an interfitting mortise and tenons 6 and 7 which extend substantially radially of the rim. And the sections are secured together at their abutting faces in any suitable manner as by welding or by riveting as at 8.

The abutting faces 9 of the hub sections are also provided with interfitting mortise and tenons 10 and 11 extending in radial directions.

The abutting faces of the rim segments are provided on transverse end walls 12 on the ends of such segments and the abutting end faces of the hubs are also provided with transverse walls 13. The inner edges 14 of the walls 13 provide a bearing for the hub of the wheel or the axle hub, on which the wheel is eventually mounted. Thus the bore 15 of the wheel hub is open except at the edges 14 of the transverse walls or webs 13. Thus the wheels can be made with a central opening or bore to receive an axle hub of the smallest diameter, and can be readily machined out to fit larger hubs, by machining off the edges 14 and the inner edges 16 of the side wall of the wheel hub, and hence, the necessity of providing the bore of the wheel hub with a wall thick enough to accommodate the smallest axle hubs, and to be machined out to receive larger sizes of axle hubs is eliminated, and furthermore considerable saving in metal and reduction of weight in the wheel is effected.

The inner portions 17 of the walls 13 are preferably out of radial alinement with the portion of the wall 13 formed with the mortise and tenons 10 and 11, in order to form slots 18 opening into the bore 15 of the hub section. This construction facilitates the machining of the bore of the hub section to fit larger sizes of axle hubs.

19 is a demountable rim having an annular inclined wedge face 20 coacting with a complemental face on the edge of one side wall of the felloe which wall is higher as seen at 21 than the other wall 22 of the felloe. The demountable rim is also formed with an inner annular flange 23 encircling the periphery of the wall 22. The rim is held on the felloe by wedges 24 insertable at intervals between the wedge faces 25 of the rim 19, and wedge faces 26 on the flange 23. The wedges 24 are operated by bolts 27 extending through the side wall of the felloe, nuts 28 screwing on the bolts, and lever plates 29 fulcruming at 30 on the felloe and pressing at 31 on the wedges 24. The wedges 24 act to force the wedge faces 20 against the wedge face of the wall 21.

What I claim is:

1. A hollow cast wheel comprising sections, each section including a felloe segment, a hub segment and spokes connecting the segments, the felloe segments having abutting faces at their ends, such abutting faces being formed respectively with interfitting mortise and tenon, substantially as and for the purpose described.

2. A hollow cast wheel comprising sections, each section including a felloe segment, a hub segment and spokes connecting the segments, the felloe segments having abutting faces at their ends, such abutting faces being formed respectively with interfitting mortise and tenon, the mortise and tenon extending in a general direction radially of the wheel, substantially as and for the purpose specified.

3. A hollow cast metal wheel comprising sections, each section including a hollow felloe segment, a hollow hub segment, and spokes connecting them, some of said segments having faces at their ends abutting against the faces of the adjoining segments, each pair of such abutting faces being formed respectively with an interfitting mortise and tenon, substantially as and for the purpose set forth.

4. A hollow cast metal wheel comprising sections, each section including a hollow felloe segment, a hollow hub segment, and spokes connecting them, some of said segments having faces at their ends abutting against the faces of the adjoining segments, each pair of such abutting faces being formed respectively with an interfitting mortise and tenon, such faces extending in a general direction radially of the wheel, substantially as and for the purpose described.

5. A hollow cast metal wheel comprising sections, each section including a hollow felloe segment, a hollow hub segment, and spokes connecting them, some of said segments having faces at their ends abutting against the faces of the adjoining segments, each pair of such abutting faces being formed respectively with an interfitting mortise and tenon extending in a general direction radially of the wheel, substantially as and for the purpose specified.

6. A hollow cast wheel comprising sections, each section including a felloe segment, a hub segment and spokes connecting the segments, the felloe segments having abutting faces at their ends, such abutting faces being formed respectively with interfitting mortise and tenon, the sections being secured together at their abutting faces, substantially as and for the purpose set forth.

7. A hollow cast wheel comprising sections, each section including a felloe segment, a hub segment and spokes connecting the segments, the felloe segments having abutting faces at their ends, such abutting faces being formed respectively with interfitting mortise and tenon, the mortise and tenon extending in a general direction radially of the wheel, the sections being secured together at their abutting faces, substantially as and for the purpose described.

8. A cast metal wheel having a hollow hub, formed with an open bore for receiving an axle hub, the hollow hub having transverse walls at intervals, the inner edges of which are arranged to bear on the axle hub.

9. A hollow cast wheel comprising sections, each section including a felloe segment, a hub segment and spokes connecting the segments, the felloe segments having transverse walls at the abutting ends, the central opening formed by the hub segments for receiving an axle hub having its circumferential wall open and the inner edges of the abutting end walls being arranged to bear on the axle hub.

In testimony whereof, I have hereunto signed my name at Syracuse, in the county of Onondaga, and State of New York, this 4th day of September, 1923.

JEWELL W. VANDERVEER.